United States Patent [19]

Rashid

[11] Patent Number: 5,043,911
[45] Date of Patent: Aug. 27, 1991

[54] MULTIPLEXING A/D CONVERTER FOR A GENERATOR CONTROL UNIT

[75] Inventor: Abdul Rashid, Rockford, Ill.

[73] Assignee: Sundstrand Corporation, Rockford, Ill.

[21] Appl. No.: 455,271

[22] Filed: Dec. 22, 1989

[51] Int. Cl.⁵ .............................................. G06F 15/20
[52] U.S. Cl. .................................. 364/494; 364/132; 364/134
[58] Field of Search ............... 364/494, 131, 132, 134, 364/579, 942.03, 942.4, 931.44, 931.46; 377/77, 91, 92, 94

[56] References Cited

U.S. PATENT DOCUMENTS

| | | | |
|---|---|---|---|
| 4,032,757 | 6/1977 | Eccles | 364/431.02 |
| 4,258,545 | 3/1981 | Slater | 364/431.02 |
| 4,730,256 | 3/1988 | Niimi et al. | 364/134 |
| 4,740,883 | 4/1988 | McCollum | 364/140 |
| 4,803,618 | 2/1989 | Ita et al. | 364/134 |

Primary Examiner—Parshotam S. Lall
Assistant Examiner—Ellis B. Ramirez
Attorney, Agent, or Firm—Wood, Phillips, Mason, Recktenwald & VanSanten

[57] ABSTRACT

A "reversible master/slave" handshaking protocol is disclosed for addressing the problem of interfacing a multiplexing analog-to-digital (A/D) converter, having a first operating rate, to a microprocessor, having a second operating rate. In the specific embodiment of a generator control unit (GCU) for an electrical power generating system, an analog multiplexer (124), an A/D converter (126), and a dual-port RAM (130) are controlled by an A/D controller (134) to provide data words to a voltage regulator processor (92). If a fast A/D converter is used, then the A/D controlling system will multiplex and convert samples from all of the analog input signals, load the RAM, and wait for the processor to read the RAM. If the A/D conversion rate is slow, the A/D controller will continuously sample all the multiplexed channels, while the processor waits for the appropriate channel information to be loaded into the RAM. In this manner, data acquisition can be perform utilizing A/D converters having various conversion rates, multiplexers having additional channels, or microprocessors having numerous feedback control loops.

20 Claims, 12 Drawing Sheets

MULTIPLEXING A/D CONVERTER FOR A GENERATOR CONTROL UNIT

CROSS REFERENCE TO RELATED APPLICATIONS

This application contains subject matter related to copending application Ser. No. 07/430,818, filed Nov. 2, 1989, (Atty. Docket No. B03195-AT1-USA), entitled "Digital Voltage Regulator", assigned to the same assignee as the present application.

FIELD OF THE INVENTION

The present invention generally relates to the analog-to-digital (A/D) conversion of multiple analog input signals for use by a microprocessor. More particularly, this invention relates to an improved generator control unit for an electrical power generating system, wherein an analog multiplexer, an A/D converter, and a dual-port RAM are controlled by an A/D controller to provide data words to a voltage regulator processor.

BACKGROUND OF THE INVENTION

A conventional electrical power generating system (EPGS) for an aircraft, in one known form, comprises an integrated drive generator including a constant speed drive and a generator. The integrated drive generator receives mechanical power at varying speed from an aircraft engine, and delivers electrical power at a constant frequency. The constant speed drive includes a speed control assembly which receives mechanical input power at varying speeds from the aircraft engine, and which delivers power from its output shaft at a constant speed. The generator comprises a salient pole machine with a rotating field which is excited through an exciter powered by a permanent magnet generator (PMG) through a voltage regulator. Such conventional systems use a generator control unit (GCU) to provide voltage regulation and speed regulation. Specifically, a voltage regulator provides excitation power to an exciter at levels which provide constant system voltage at the point of regulation. A speed controller controls the trimming of a servo valve to maintain constant generator speed, and thus constant frequency.

Prior generator control units used either analog or digital circuits, with the choice being based on factors such as weight, size, cost, and complexity of control logic. In analog GCU systems, both integrated circuits and discrete components are used. The analog input signals are typically combined, and perform their required functions, using analog type controls. Such system products incorporate standard, off-the-shelf components. Implementing a system which has the complexity of a generator control unit with standard product technology requires the use of many hundreds of electrical devices even for a relatively simple application, such as for a single-channel EPGS. Each device adds additional weight to the product, including indirect weight in the form of additional circuit board area and housings required to support the inclusion of each device. Since commercial and military aircraft are the intended end-use of such products, it is desirable to minimize this additional weight. Furthermore, analog circuits tend to be environmentally sensitive. For example, parameter drift results owing to changes in temperature and humidity, as well as age of the devices. Moreover, using analog technology, the control functions cannot be easily modified. Instead, circuit components must be changed, resulting in a custom design for each different application.

Conversely, in digital control systems, all of the analog input signals are converted to digital form, and certain control and protection functions are controlled by a microprocessor and associated software. As such, the control system is inherently more flexible in implementing different control schemes. The microprocessor continuously and sequentially checks for proper system conditions, and performs the programmed sequence of instructions upon proper system commands.

However, the actual flexibility of such a digital system is limited due to the severe constraints on processing time available to the microprocessor, which must perform both control and protection functions. In fact, known GCU systems employ analog control circuitry for implementing the voltage regulator functions. As a result, it is necessary to provide individual circuit components which are solely associated with voltage regulation. Therefore, the designer must "start from scratch" in designing a generator control unit for each new application. This results in each generator control unit being custom-made and therefore more expensive.

In the aforementioned copending application, a digital voltage regulator is disclosed for a generator control unit. The voltage regulator comprises a digital control circuit including a processor having a memory circuit. The processor is responsive to system condition inputs for establishing different parameters of the control signal in accordance with a voltage regulation algorithm. In performing the voltage regulation function, the processor executes multiple sets of instructions corresponding to multiple feedback controls loops. At least seven interrelated feedback control loops are utilized in the digital voltage regulator chip. Such sophisticated feedback control loops require equally sophisticated analog-to-digital conversion techniques, which were previously unnecessary for prior analog systems or simple digital systems.

Known A/D interfacing techniques are ill-suited for use with many complex digital control systems, such as the multiple-loop digital voltage regulator in the GCU. First, an A/D converter having an extremely fast operating rate would be required to keep up with the digital voltage regulator processor. Using today's technology, an A/D converter having such a fast conversion rate would be prohibitively expensive. Second, if a slower A/D converter were utilized, the feedback control loops would not be operating on the most up-to-date information, and therefore would become unstable. Third, most A/D conversion techniques are limited to specific controllers in particular applications. However, the digital voltage regulator and GCU of the present invention are designed to be employed in a wide variety of applications without hardware redesign. Hence, compatibility with A/D converters having different operating speeds is necessary to maintain design flexibility.

A need, therefore, exists for an improved multiplexing analog-to-digital conversion technique adapted for acquiring data derived from a plurality of analog input signals, and having the flexibility to utilize A/D converters with various conversion rates.

SUMMARY OF THE INVENTION

Accordingly, it is an object of the present invention to provide an improved method and apparatus for controlling an analog-to-digital converter and a microprocessor in response to their respective operating rates.

Another object of the present invention is to provide a method for acquiring data from a plurality of input signals which are to be read by a microprocessor having multiple feedback control loops.

A further object of the present invention is to provide a generator control unit for an electrical power generating system, wherein the analog-to-digital conversion for the voltage regulator function can be performed using A/D converters having a wide range of conversion times.

These and other objects are achieved by the present invention, which, briefly described, is an improved multiplexing A/D converter for a generator control unit. The generator control unit includes a generator having a power output signal which is controllable by a generator control signal. An analog control circuit monitors various parameters of the generator power output signal, and provides a plurality of corresponding analog input signals. The input signals are multiplexed and fed to an A/D converter, which has a first operating rate. A buffer memory stores the sampled data words output from the A/D. A voltage regulator (VR) processor, having a second operating rate, produces the generator control signal in response to the stored data words, thus maintaining the generator output power to desired voltage level. An interface processor controls the multiplexer, the A/D converter, the buffer memory, and the VR processor in response to the respective operating rates of the A/D converter and the VR processor. In this manner, the A/D converter and the voltage regulator processor exhibit a "reversible master/slave" relationship as determined by their respective operating rates.

In accordance with the method of the present invention, the operation of a programmable controller and a microprocessor are controlled during the acquisition of data derived from a plurality of input signals in accordance with the following steps: (a) addressing a multiplexer to output a particular one of the plurality of analog input signals as a time-multiplexed analog output signal; (b) converting a portion of the time-multiplexed analog output signal into digital data to provide a data sample; (c) addressing a particular storage location in a memory; (d) storing the data sample at the particular storage location in the memory; (e) providing an end-channel signal from the programmable controller to the microprocessor; (f) repeating the above steps using new multiplexer and memory addresses until data samples from a desired plurality of the analog input signals have been stored in the memory; (g) reading a plurality of storage locations of the memory by the microprocessor only after the end-channel signal corresponding to that storage location has been received; (h) providing a start-multiplexing signal from the microprocessor to the programmable controller only after the desired storage locations have been read; and (i) waiting for the start-multiplexing signal from the microprocessor before repeating the above steps.

In accordance with the present invention, data acquisition can be perform utilizing A/D converters having various conversion rates, multiplexers having additional channels, or microprocessors having numerous control loops. For example, if a fast A/D converter is used, then the controller will multiplex and convert samples from all analog input signals, load the memory, and wait for the processor to send a start-multiplexing flag. If the A/D conversion rate is slow, the controller will continuously cycle through all the multiplexed channels while the processor waits for the appropriate channel information to be loaded into the memory. Thus, a reversible master/slave handshaking protocol is established during the data acquisition procedure.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description taken in connection with the accompanying drawings, in the several figures of which like-referenced numerals identify like elements, and in which:

DETAILED DESCRIPTION OF THE INVENTION

Figure 1:
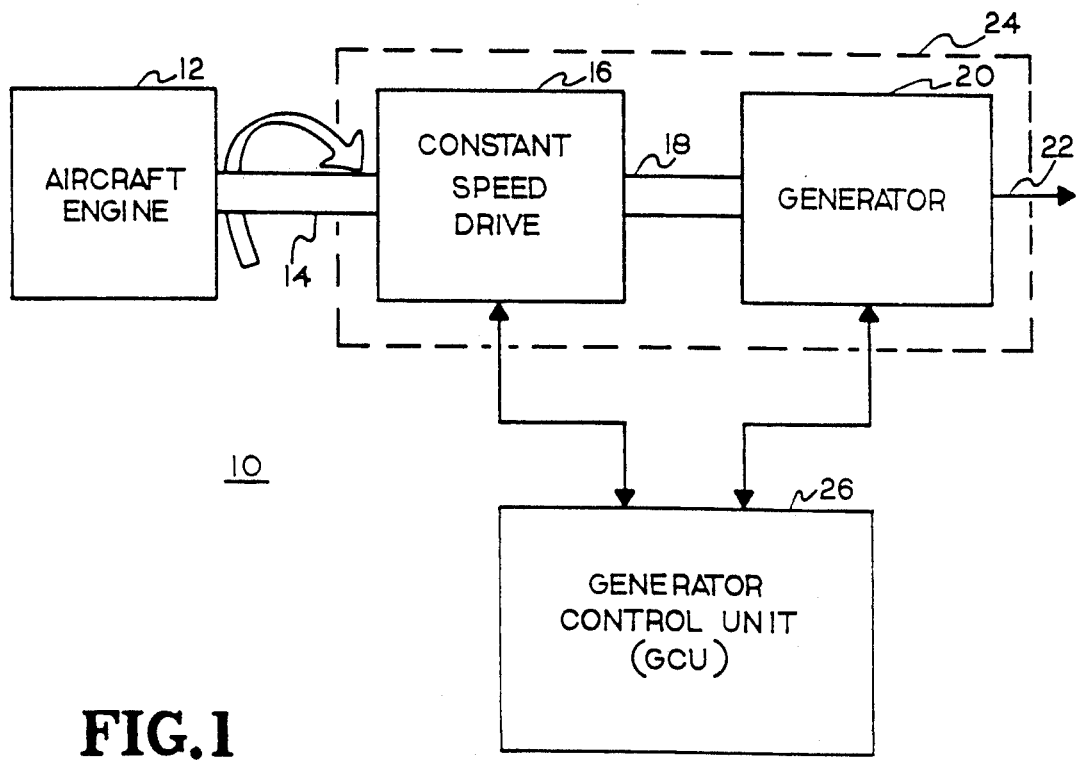
FIG. 1 is a simplified block diagram of an aircraft electrical power generating system (EPGS), including a generator control unit (GCU) according to the present invention.

Referring now to FIG. 1, there is shown a simplified block diagram of an electrical power generating system (EPGS) 10 in accordance with the present invention. The EPGS 10 provides constant voltage, constant frequency power to the remainder of the aircraft. An aircraft engine 12, typically a turbine engine, turns a rotating input shaft 14 at a varying speed. A constant speed drive 16 receives this mechanical input power from the input shaft 14 at a varying speed, and delivers mechanical power to an output shaft 18 at a constant speed. An electrical generator 20 is driven by the constant speed shaft 18, and develops electrical output power at a constant frequency to the power bus 22. In combination, the constant speed drive 16 and the generator 20 are known as an integrated drive generator 24.

The generator control unit (GCU) 26 monitors the system conditions, including the variable speed of the input shaft 14, and the output voltage, current, and frequency of the generator 20. The GCU 26 provides a controlled output to the constant speed drive 16, which maintains the speed of the output shaft 18 constant, and thus maintains the output frequency of the generator 20 within prescribed limits.

Figure 2:
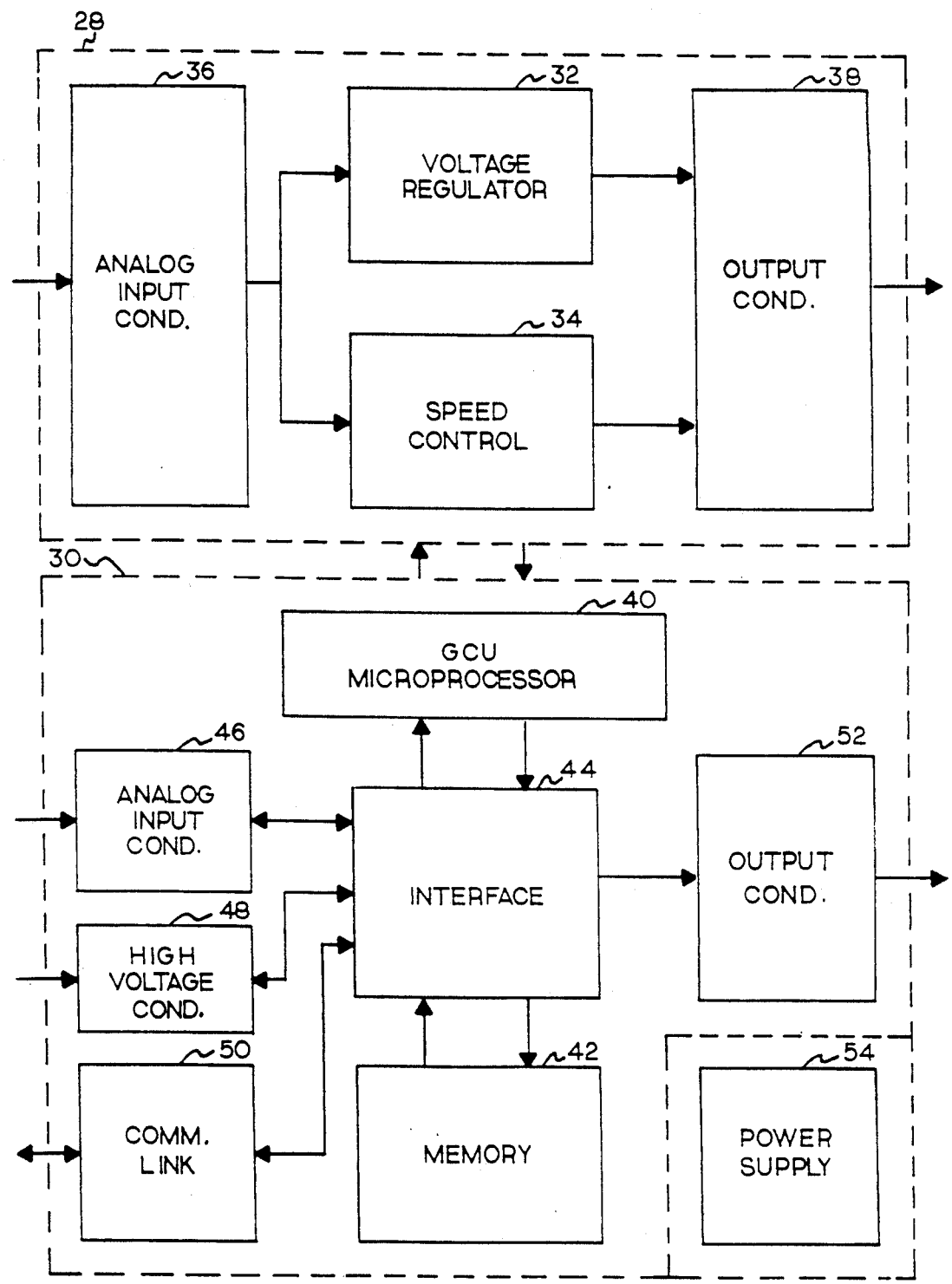
FIG. 2 is a functional block diagram of the GCU of FIG. 1.

FIG. 2 illustrates a functional block diagram of the GCU 26 of FIG. 1. The GCU 26 provides for separation of control functions, in a control section 28, from protection functions, in a protection section 30.

The GCU control section 28 includes a voltage regulator block 32 and a speed control block 34, each having inputs conditioned by an analog input conditioning block 36, and each having outputs conditioned by an output conditioning block 38. The analog input conditioning block 36 converts analog input signals from voltage and speed sensors into their digital representation for voltage regulator and speed control processing. The outputs of the output conditioning block 38 are connected to the exciter field winding of the generator 20, and to the servo valve or trim head of the constant speed drive 16.

The GCU protection section 30 includes a GCU microprocessor block 40 which executes protection, breaker control, built-in testing (BIT), and other communications functions and programs stored in a memory 42. An interface block 44, connected to the microprocessor block 40, relieves the microprocessor of the signal conditioning interface burden, as well as integrates most of the digital support functions which microprocessors normally require. An analog input conditioning block 46, and a high voltage conditioning block 48, perform similar functions to the analog input conditioning block 36. A communications link 50 allows the microprocessor 40 to communicate via the interface block 44 to a serial link. An output conditioning block 52 provides voltage and current amplification for output signals from the interface block 44. For example, the output conditioning block 52 controls operation of the relay contactor of the generator, as well as other conventional generator fault protection devices. A power supply 54 provides regulated power for the GCU.

Figure 3:
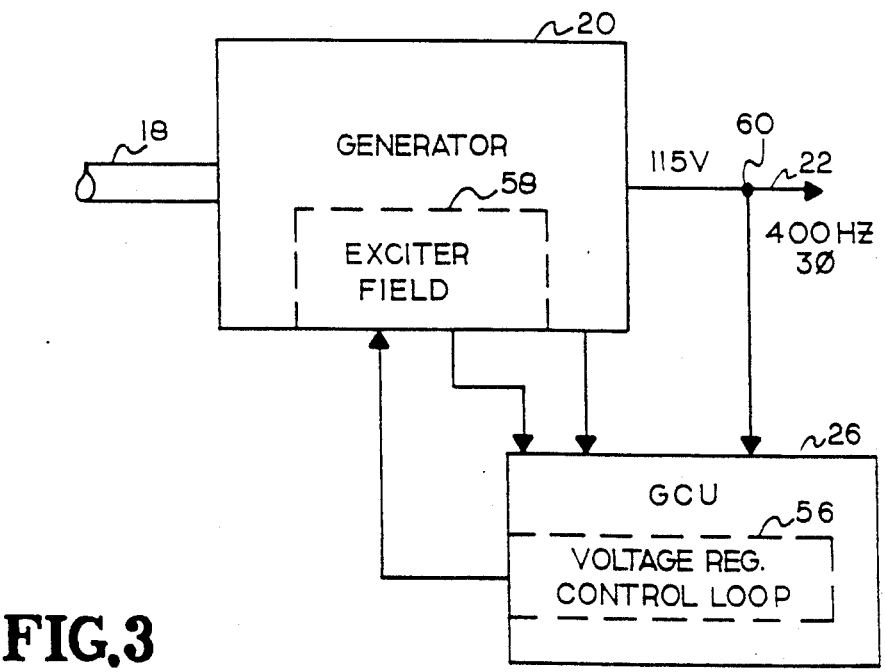
FIG. 3 is a simplified block diagram of a GCU voltage regulator control loop.

FIG. 3 illustrates the interconnections of the primary voltage regulator control loop 56 inside the GCU 26. The voltage regulator control loop 56 controls the polyphase output voltage at 22 of the generator 20 by regulating the energy coupled from the exciter field winding 58 to the exciter rotor, and ultimately to the main generator. The control loop regulates the generator output by sensing the generator output voltage at a point of regulation (POR) 60. In a specific embodiment of the invention, the generator 20 outputs a three-phase 115 VAC voltage at a constant 400 Hertz.

Figure 4:
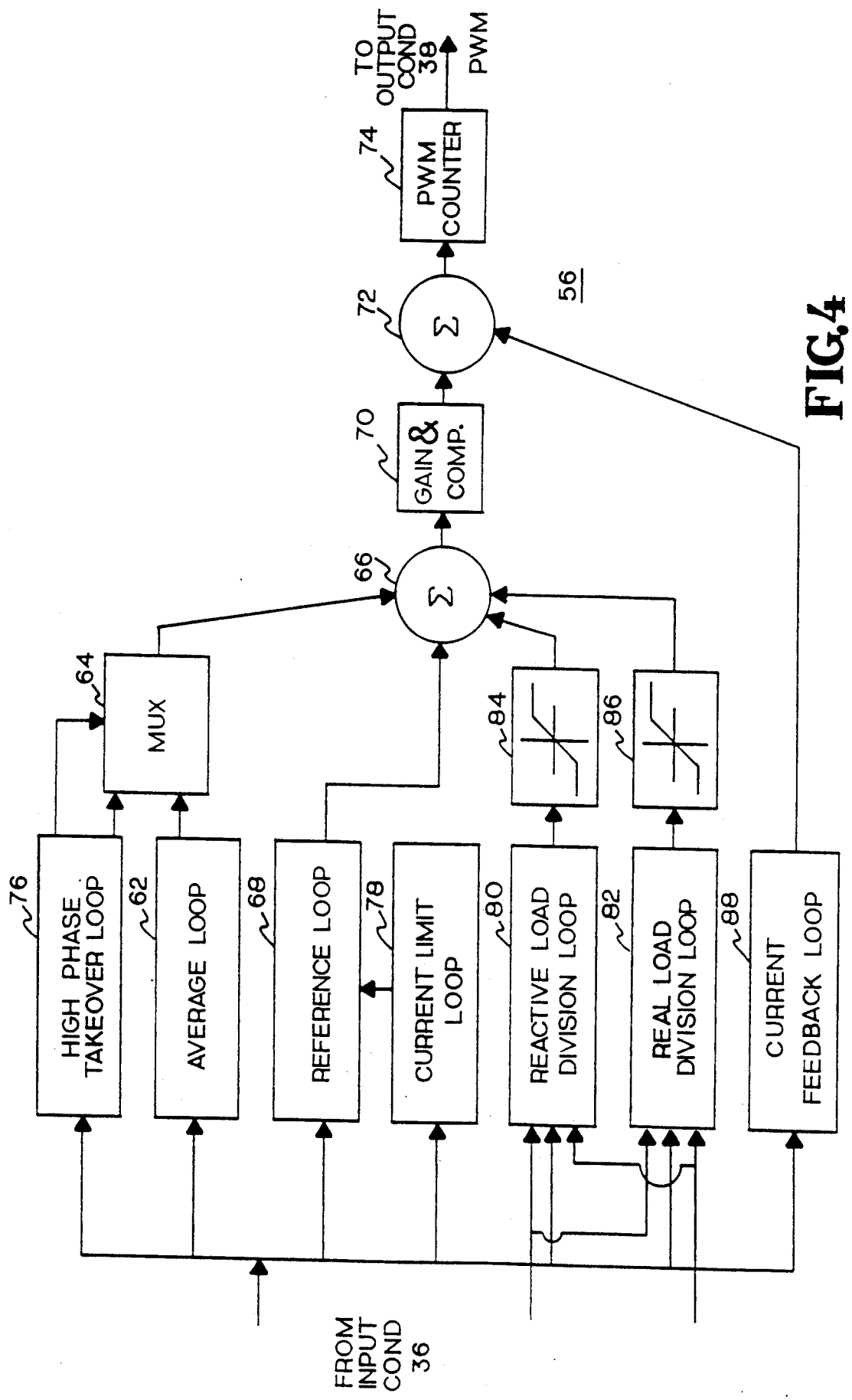
FIG. 4 is a detailed functional block diagram of the control loops implemented in the voltage regulator of FIG. 3.

Referring to FIG. 4, the internal functional operation of the primary control loop 56 implemented by the voltage regulator 32 is shown. The three-phase current and voltage signals of the generator 20 are sensed at the POR 60, conditioned by the analog input conditioner block 36, and provided to the voltage regulator circuit 32. This information is then processed by the seven internal control loops illustrated. The digitized POR information is processed by an average loop 62 and applied through a multiplexer 64 to a first summer 66, which also receives a reference value from a reference loop 68. The summer calculates the error representing the difference between the POR input and a POR reference. The error is compensated by a gain and compensation function 70, and applied via a second summer 72 to a pulse width modulation (PWM) counter 74. The gain and compensation function constants are loaded from the microprocessor 40 to the voltage regulator 32 upon power up. The compensated error signal alters the PWM duty cycle, which in turn varies the current in the exciter field 58.

If one or more of the three phases goes above a threshold of, for example, 122 VRMS, then a high phase takeover loop 76, also connected to multiplexer 64, takes over the control function from the average loop 62, to prevent any voltage phases from going any higher. During the occurrence of a short circuit in the EPGS 10, a current limit loop 78, connected to the reference loop 68, decreases the POR voltage reference in order to allow a controlled amount of current to flow through the fault. A reactive load division loop 80, and a real load division loop 82, are operative for multichannel parallel systems. Their function is to share the load equally among all the generators, such that none of the generators support excessive loads during steady state operation. The outputs of loops 80 and 82 are passed through two limit functions 84 and 86, respectively, to the first summer 66. A current feedback loop 88 is input to the second summer 72, and is used for compensating the change in exciter field resistance over temperature and life.

Hence, the voltage regulator circuit 32 includes numerous voltage regulator feedback control loops. Each of these control loops is responsive to the various parameters monitored and conditioned by the analog input conditioning block 36. As will be described in more detail below, the analog input conditioner block 36 includes a multi-channel analog multiplexer having one or more channels associated with each of the voltage regulator control loops. An analog control chip (ACC) sequencer addresses these multiplexed channels to provide the proper input parameters at the proper time.

Table 1 (below) illustrates the multiplexer (MUX) address, the input signal, and the voltage regulator control loop, respectively, for each of the twelve multiplexer channels. Note that several of the control loops utilize input signals from more than one multiplexer channel. For this reason, the control loops are arranged in four groups A, B, C, and D, as shown. Also note that an eighth feedback control loop has been added for diagnostic testing. This built-in testing (BIT) control loop performs A/D voltage calibration by utilizing a known voltage, e.g., 2.50 VDC, as the midpoint of the A/D conversion range.

TABLE 1

| MUX ADDR | INPUT SIGNAL | CONTROL LOOP | GROUP |
| --- | --- | --- | --- |
| 0000 | POR A | | |
| 0001 | POR B | VR High Phase Takeover | A |
| 0010 | POR C | | |
| 0011 | GEN CUR A | | |
| 0100 | GEN CUR B | VR Current Limit | B |
| 0101 | GEN CUR C | | |
| 0110 | POR AVG | VR Balanced Average | B |
| 0111 | DIF AVG CUR | Real Load Division | C |
| 1000 | SERVO CUR | Reactive Load Division | C |
| 1001 | CUR FDBK | VR Current Feedback | D |
| 1010 | A/D MIDPT | Built-In Test (BIT) | D |
| 1011 | VR POT ADJ | VR Reference Adjust | D |

Figure 5:
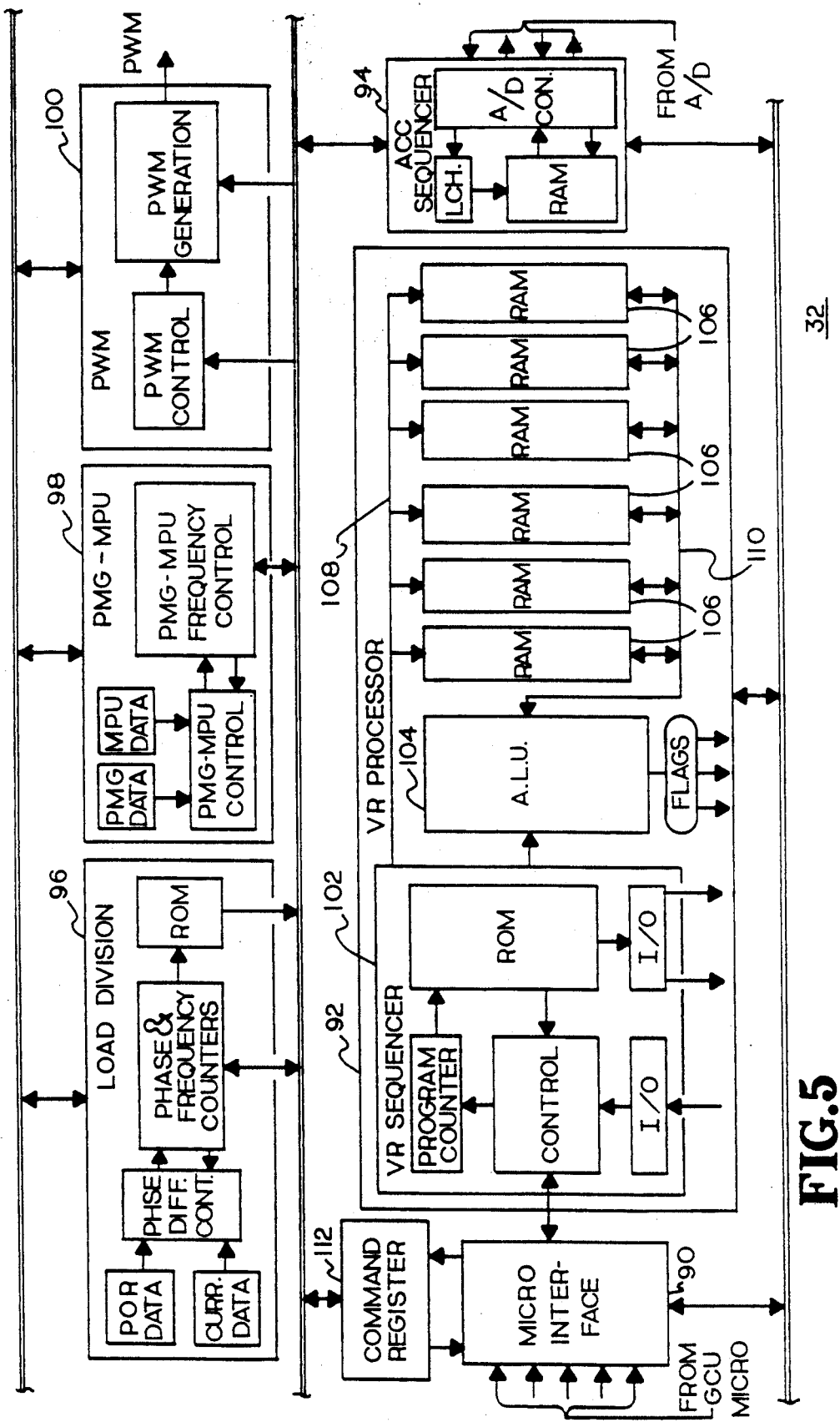
FIG. 5 is a detailed hardware block diagram of the architectural implementation of the voltage regulator of FIG. 3.

Referring now to FIG. 5, a detailed block diagram of the circuit architecture of the voltage regulator circuit 32 is shown. The principal functional elements comprise a microprocessor interface block 90, a voltage regulator (VR) processor 92, an analog control chip (ACC) sequencer 94, a load division block 96, a permanent magnet generator (PMG) and magnetic pickup unit (MPU) sensing block 98, and a pulse width modulation (PWM) drive block 100.

The microprocessor interface block 90 controls the data transfer between the GCU microprocessor 40 of FIG. 2 and the remainder of the voltage regulator. Programmable and readable registers and RAM memory within the voltage regulator chip are mapped to the memory address interface of the GCU microprocessor 40 for chip initialization, built-in testing functions, and diagnostics. The microprocessor interface block 90 has three important registers, i.e., two status registers (not shown) and a command register (shown as a separate block 112). The status registers indicate the internal conditions of the voltage regulator circuit 32. The command register 112 selects different peripherals for bench testing and VR processor debugging. The operations of microprocessor interface 90 are primarily performed during chip initialization, which takes place immediately upon system reset, and upon diagnostic testing, which can take place upon interrupts.

The voltage regulator processor block 92 is the heart of the voltage regulator chip 32. The VR processor 92 controls the data transfer between the GCU microprocessor 40 and the voltage regulator 32, and also serves to interface between the other peripheral voltage regulator blocks 94, 96, 98, and 100. The components of VR processor 92 include a VR sequencer 102, an arithmetic logic unit (ALU) 104, and a plurality of memory devices 106.

The VR sequencer 102 includes a programmable controller which controls all the loop functions described above. Any of the loop functions, namely load division, current limit, high phase takeover, POR average, etc., can be accessed by the VR sequencer. The VR sequencer's control algorithm is centered around the POR average voltage loop. When the sequencer 102 sends out a request, the loop function performs its task and returns with an acknowledge flag upon completion. The VR sequencer 102 also contains a diagnostic controller for the control loops, such that the GCU microprocessor 40 can interrogate each internal register of the voltage regulator.

The arithmetic logic unit 104 is used to perform multiplication, addition, subtraction, etc. for the VR processor 92. The VR sequencer 102 and the ALU 104 communicate with the various random access memories (RAM) 106 via an internal address bus 108 and an internal data bus 110. The RAM 106 is divided into a first section containing constants, and a second section containing variables generated by the VR processor 92.

The ACC sequencer 94 serves as an interface to an off-chip A/D converter and a twelve-channel multiplexer, which is part of the analog input conditioner block 36 of FIG. 2. A functional description of each of the twelve multiplexer channels is set forth in Table 1 above. An internal A/D controller sequences through these channels, thus time-multiplexing the analog input signals to the A/D. The data samples from the A/D are then latched and stored in an internal RAM buffer as channel data. The operation of the ACC sequencer 94 will be explained in more detail below.

The load division block 96, the PMG and MPU sense block 98, and the PWM block 100, are free-running peripheral devices which set a flag upon task completion. The load division block 96 is used in a multi-generator operation, and operates to divide the load equally between the multiple generators. The PMG and MPU frequency sense block 98 is used to enable or disable the output driver of the PWM block 100 to the exciter field via magnetic pickup ready speed or PMG under frequency. The output of PWM block 100 is provided to the exciter field and to a current driver circuit for regulation of the system voltage. The PWM block accepts the calculated inputs from the voltage regulator control loops which determine the characteristics of the PWM square wave output.

Figure 6:
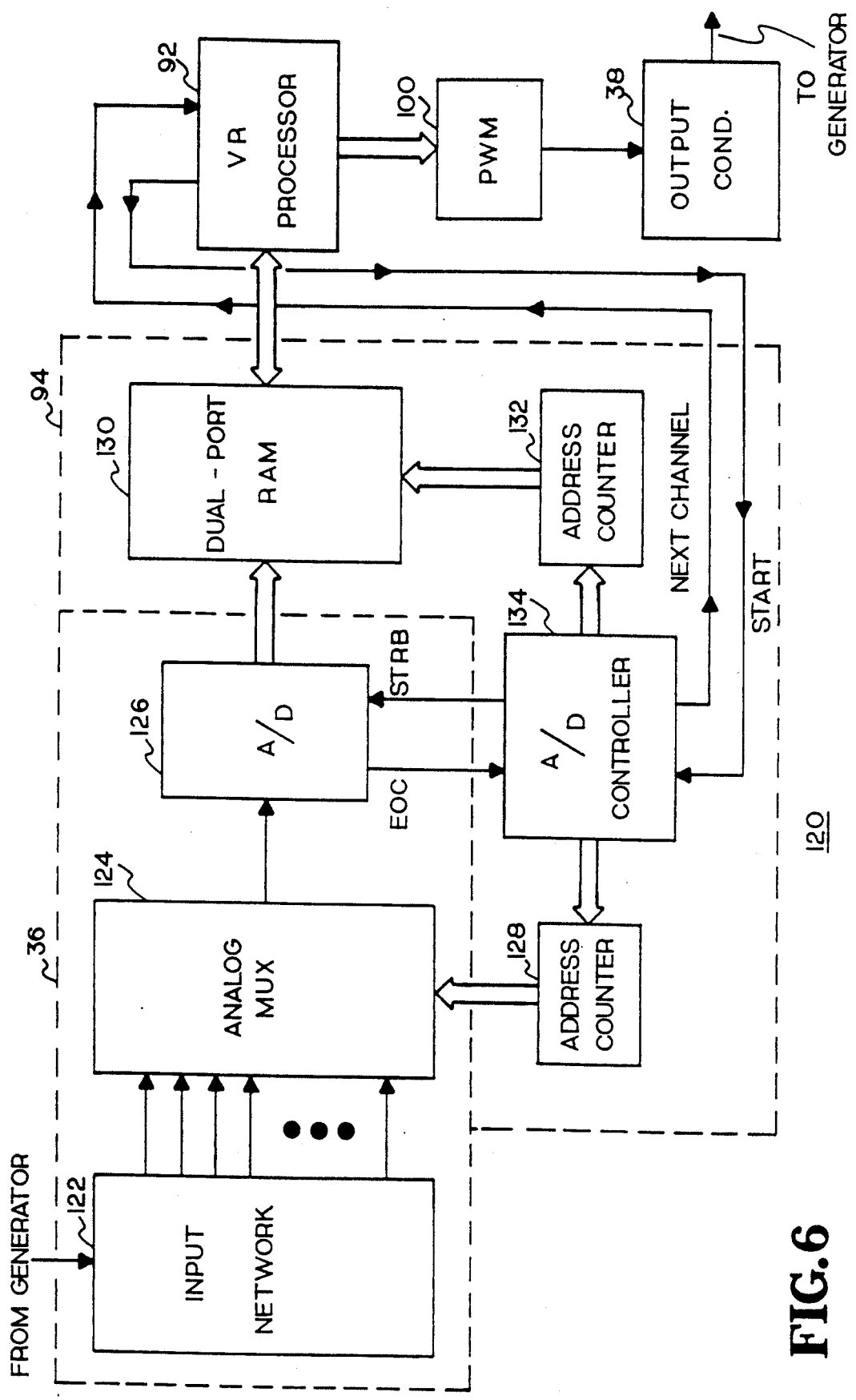
FIG. 6 is a functional block diagram of the multiplexing A/D converter system according to the present invention.

With reference to FIG. 6, the internal operation of a multiplexing A/D converter system 120 will now be described. In order to generate the PWM generator control signal, the VR processor must have access to the various input parameters of the generator power output signal. As explained above, these input parameters would include current and voltage signals for each of the three phases sampled at the POR, as well as built-in testing (BIT) monitoring points in the system. These input signals are monitored, multiplexed, digitized, and stored by the analog input conditioning block 36 and the ACC sequencer 94, shown here with dashed lines.

The input network 122 of the analog input conditioner block 36 senses the input parameters, and converts them to the twelve analog input signals described in Table 1. For example, the seventh channel of the input network 122 represents the POR average voltage parameter, which represents the average voltage of the polyphase generator output signal.

The twelve analog input signals are then applied to an analog multiplexer 124, which provides a single time-division multiplexed output signal to an A/D converter 126. Although twelve channels are used in the specific embodiment described herein, any number of channels equal to or greater than two can be multiplexed. The twelve-channel analog multiplexer 124 is addressed by a four-bit address counter 128. The counter is designed to count from zero to eleven, providing the MUX addresses shown in Table 1.

The A/D converter 126 digitally samples the time-multiplexed analog output signal from the multiplexer 124 to provide a data sample to be stored in a dual-port random-access memory (RAM) 130. In one embodiment of the invention, the A/D converter 126 is a ten-bit A/D converter which begins sampling upon receipt of an A/D strobe (STRB) signal. The STRB line is used as the start-of-conversion signal for the A/D converter. After an appropriate conversion time, the A/D outputs an end-of-conversion (EOC) signal, and then waits for the next strobe signal before sampling the next channel. The EOC signal from the A/D converter signifies the data is available at its output. The A/D converter 126 would typically have a conversion time on the order of tens of microseconds. However, note that it is a feature of this invention that different A/D converters may be used having a wide range of conversion times.

The sampled data word from the A/D is then stored in the dual-port RAM 130. The RAM 130 is addressed by a four-bit address counter 132. Depending upon the desired RAM storage locations, the address counter 132 may correspond in output and/or in hardware to the address counter 128 used for addressing the multiplexer. The input port of the RAM 130 is a read/write port, while the output port is a read-only port providing the stored data word to the VR processor 92. The dual-port RAM serves as a buffer which stores A/D data samples from each of the twelve multiplexed channels, such that the VR processor 92 has continuous access to this information.

The A/D controller 134 interfaces the analog multiplexer 124, the A/D converter 126, and the dual-port RAM 130, to the VR processor 92. In performing this function, the A/D controller 134 also controls the MUX address counter 128, the RAM address counter 132, and the A/D strobe signal in response to the respective operating rates of the VR processor and the A/D converter. Although the specific embodiment of the A/D controller 134 is constructed as a programmable controller on a very large scale integration (VLSI) chip, any general purpose microprocessor or finite state machine could perform the same function. The method of operation of the A/D controller 134 will be explained below using the timing waveforms of FIG. 8 and the flowcharts of FIG. 9.

Figure 7:
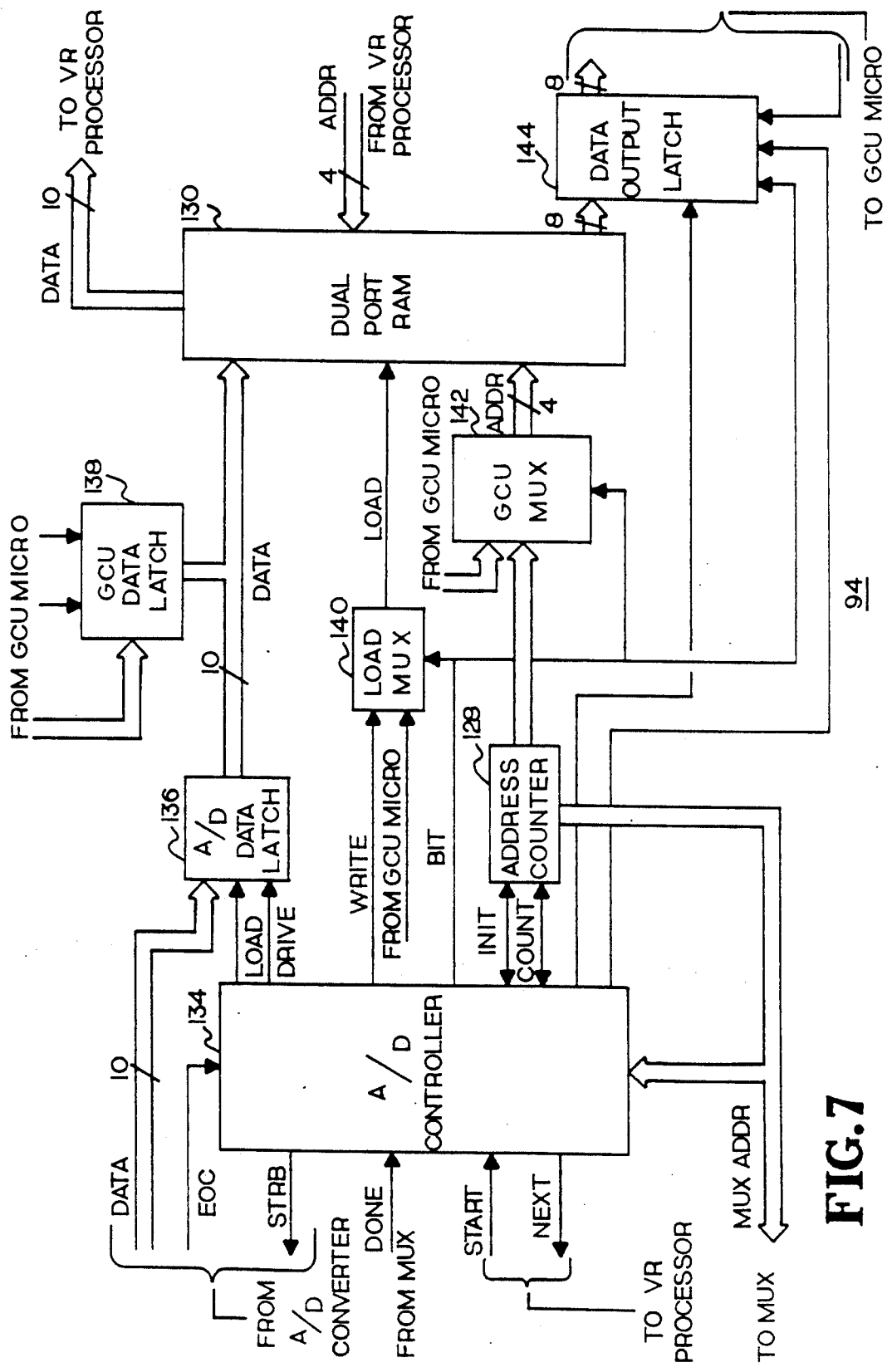
FIG. 7 is a detailed block diagram of the analog control chip (ACC) sequencer of FIG. 5, illustrating the interfacing signals of the A/D controller.

FIG. 7 illustrates a specific hardware embodiment of ACC sequencer 94. The A/D controller 134, the address counter 128, and the dual-port RAM 130 are essentially the same as shown in FIG. 6. However, the interfacing signals to the off-chip A/D converter, the analog multiplexer, the VR processor, and the GCU microprocessor, are shown in much greater detail. Also note that the MUX address counter 128 has been used to perform the function of RAM address counter 132.

Upon receipt of a start-multiplexing (START) signal from the VR processor, the A/D controller 134 initializes the multiplexer address counter 128 via an initialization (INIT) signal. The A/D controller 134 then outputs the STRB signal to the A/D converter, indicating that the A/D converter should begin converting its first sample. When the data sample has been converted, the A/D converter outputs the EOC signal to the controller 134. The A/D controller then instructs the A/D data latch 136 to load the ten-bit A/D sample via a LOAD signal.

During normal operation, A/D data latch 136 is instructed to output the data samples to the dual-port RAM 130 via a DRIVE signal. Note that A/D data latch 136 is provided in this embodiment to allow the GCU microprocessor 40 to write directly into the RAM 130 via GC data latch 138 (thus bypassing the A/D converter) for built-in testing functions. A Load Line Multiplexer 140 is then instructed by the A/D controller's WRITE signal to LOAD the data sample into the RAM. The RAM address is specified by the address counter 128, applied through a GCU address multiplexer 142. These additional multiplexers 140 and 142 are also provided for built-in testing functions. Once the data sample has been loaded into the RAM, the A/D controller 134 outputs the next channel (NEXT) signal to the VR processor.

Upon receipt of the NEXT channel signal, the VR processor addresses the dual-port RAM 130 via a four-bit address bus, and reads the contents of the RAM via a ten-bit data bus. Note that a data output latch 144 is also provided for built-in testing functions, thus permitting the GCU microprocessor to read the contents of the RAM 130 in an eight-bit format.

Figure 8A:
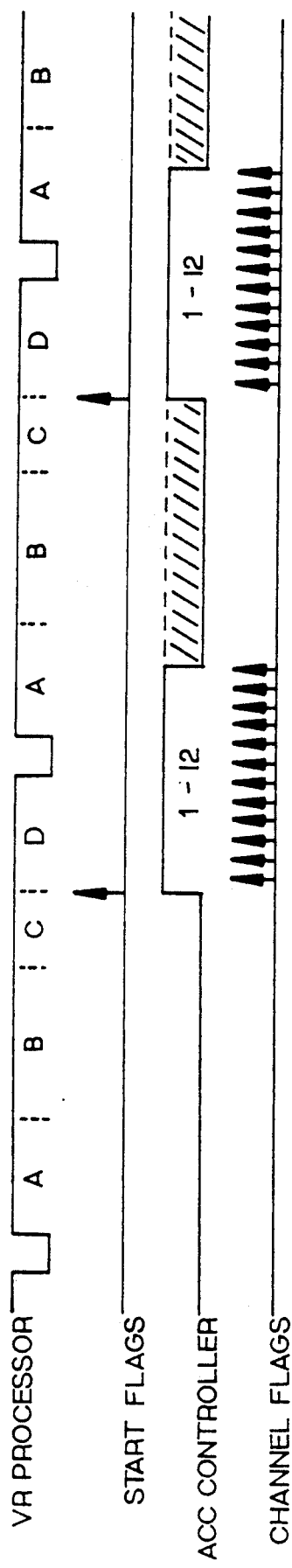
FIGS. 8a and 8b represent signal waveforms for the VR processor and the A/D controller, illustrating the handshaking protocol of the present invention.
Figure 8B:
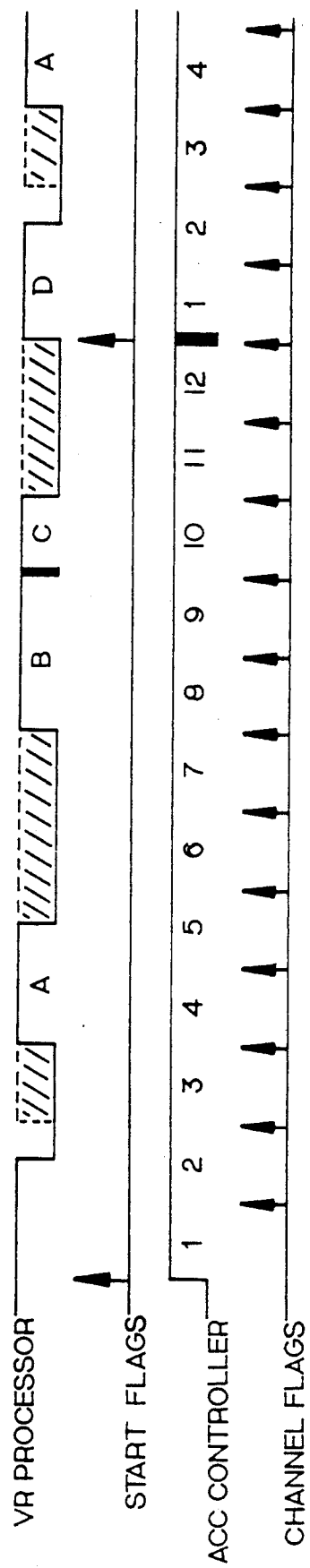

Referring now to FIGS. 8a and 8b, the waveform diagrams and timing relationships for both modes of the reversible master/slave handshaking protocol of the present invention will be described with reference to FIG. 6. These timing relationships will also be discussed in connection with the descriptions of the flowcharts.

In FIG. 8a, the VR processor 92 operates as the master, and the A/D controller 134 operates as the slave. This would be the case where a fast A/D converter is used, such that the conversion rate of the A/D converter 126 is short enough to allow sampling of all twelve multiplexed channels before the VR processor requires access to the information. The first waveform of FIG. 8a represents the VR processor loop processing time. Note that the seven feedback control loops shown in FIG. 4 (and the eighth BIT loop) are performed by the VR processor in the four groups shown in Table 1, i.e., A, B, C, and D, since various groups of analog input signals are required to perform particular control loop calculations.

In the second waveform of FIG. 8b, start flags are provided by the VR processor to the A/D controller via the START signal of FIG. 6, indicating that the VR processor has accessed the previous data samples from the RAM. Thus, the start flags instruct the A/D controller to start multiplexing the next group of twelve channels.

The third and fourth waveforms represent the processing time of the A/D controller 134, and the NEXT channel flags it outputs, respectively. Upon addressing, multiplexing, sampling, and storing the data sample for one channel into the RAM, the A/D controller issues a next channel flag to the VR processor via the NEXT channel signal. The address counters are then incremented, and the sequence repeats itself until all twelve channels (1-12) have been loaded into the RAM. The A/D controller then waits for the VR processor to access these twelve data samples from the RAM, before the A/D controller begins to reload the RAM with new data samples. When the VR processor has read the desired RAM locations, it issues a start-multiplexing flag. Hence, in this mode, the A/D controller (slave) waits for the start flag from the VR processor (master). This wait time is illustrated in FIG. 8a as a hatched area shown between A/D controller cycles.

The same four waveforms of FIG. 8b represent the opposite mode, wherein the A/D controller is the master, and the VR processor is the slave. This would be the case where an inexpensive A/D converter, having a longer conversion time, is used. Once the start flag is received from the VR processor, the A/D controller addresses, multiplexes, converts, and stores the data word representing the digital sample for channel 1. The A/D controller then issues its next channel flag. The same addressing, multiplexing, converting, and storing steps are then performed for subsequent channels 2, 3, 4, etc.

Note, however, that the VR processor requires information from channels 1, 2, and 3 before it can perform the first control loop (VR high phase takeover loop) calculations of Group A. (See Table 1.) Hence, the VR processor must wait, for the time indicated in the hatched area, before the control loops of group A can be started. After group A has been executed, the VR processor must wait until four additional channels have been stored to perform the second and third control loops corresponding to Group B. By the time the control loops of Groups A and B have been executed, nine channel flags have been received. Thus, the VR processor can immediately perform the next two control loops of Group C, since they only require information from the first nine channels. When Group C loops have been executed, the VR processor must again wait for the remaining two channels to be multiplexed and converted before control loop Group D execution can be performed. Note, however, that the VR processor issues the start flag to the A/D controller immediately after reading the last three channels from the dual-port RAM. In other words, the VR processor is executing the last three control loops of Group D at the same time the A/D controller has begun inputting the next group of channels. Hence, the VR processor is slaved to the channel flags produced by the master A/D controller.

Figure 9A:
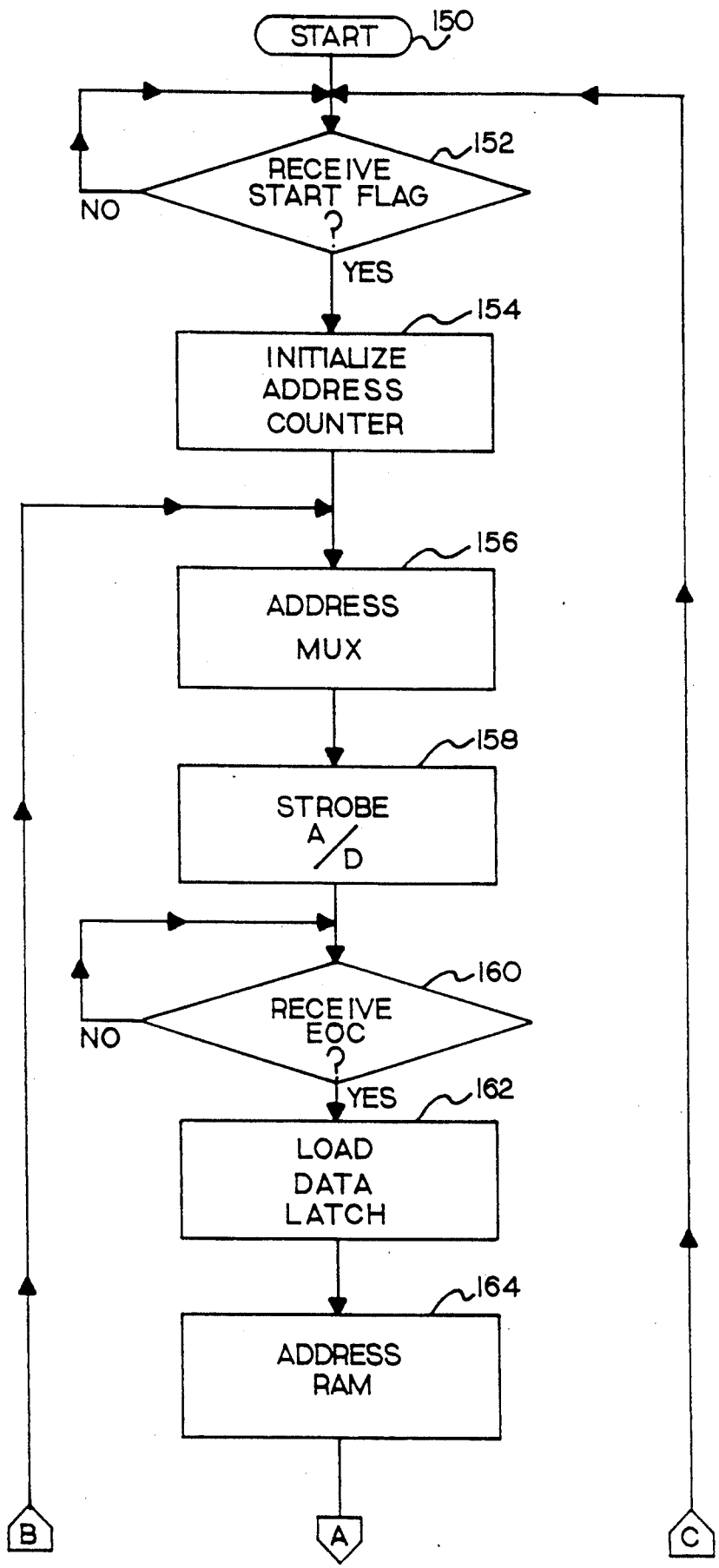
FIGS. 9a and 9b represent a flowchart for the A/D controller, illustrating the specific sequence of operations performed in accordance with the practice of the present invention.

The flowchart of FIG. 9a represents the sequence of operations performed by the A/D controller 134 of FIGS. 6 and 7. Starting at step 150, the A/D controller waits for the START flag from the VR processor in step 152. Once the start flag has been received, the multiplexer address counter 128 is initialized via the INIT signal to address the first multiplexer channel in step 154. In step 156, the multiplexer addresses the first channel, thus outputting the analog input signal of the first channel.

The A/D controller 134 then outputs a STRB signal to the A/D converter 126 in step 158. This strobe signal instructs the A/D converter to begin sampling and converting the first analog channel into a digitally sampled data word. Upon completion of the analog-to-digital conversion task, the A/D converter sends an EOC signal to the A/D controller. Therefore, in step 160, the A/D controller waits to receive the EOC before proceeding. In step 162, the controller instructs the A/D data latch 136 to latch the ten-bit data from the A/D. Since the optional A/D data latch 136 is only used for built-in testing functions, step 162 is also optional. In step 164, the A/D controller addresses the dual-port RAM 130 via the GCU address multiplexer 142.

Figure 9B:
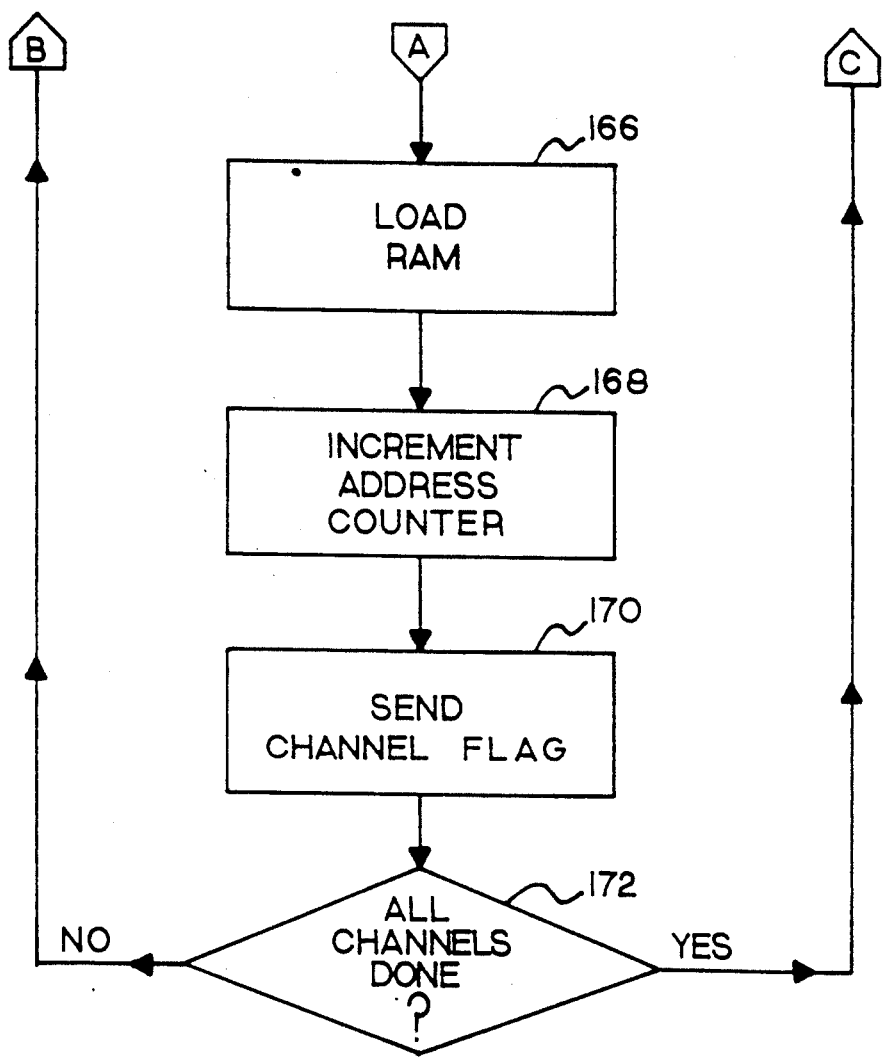

Continuing with FIG. 9b, the RAM 130 is loaded in step 166 when the A/D controller sends a WRITE signal to load multiplexer 140. Hence, the digital sample for channel one has now been stored in the RAM. In step 168, the address counter 128 is incremented by sending a COUNT signal from the A/D controller. Finally, the NEXT channel flag is sent to the VR processor in step 170. The A/D controller then checks the DONE line from the multiplexer in step 172, to test whether all twelve channels have been multiplexed. If all channels are not done, control returns to step 156 to address the next multiplexer channel. The process repeats itself until all channels have been multiplexed, wherein control returns to step 152 to again wait for the startmultiplexing flag from the VR processor. Note that the flowchart could easily be modified to have the A/D controller address only a few desired channels instead of all twelve channels.

Figure 10A:
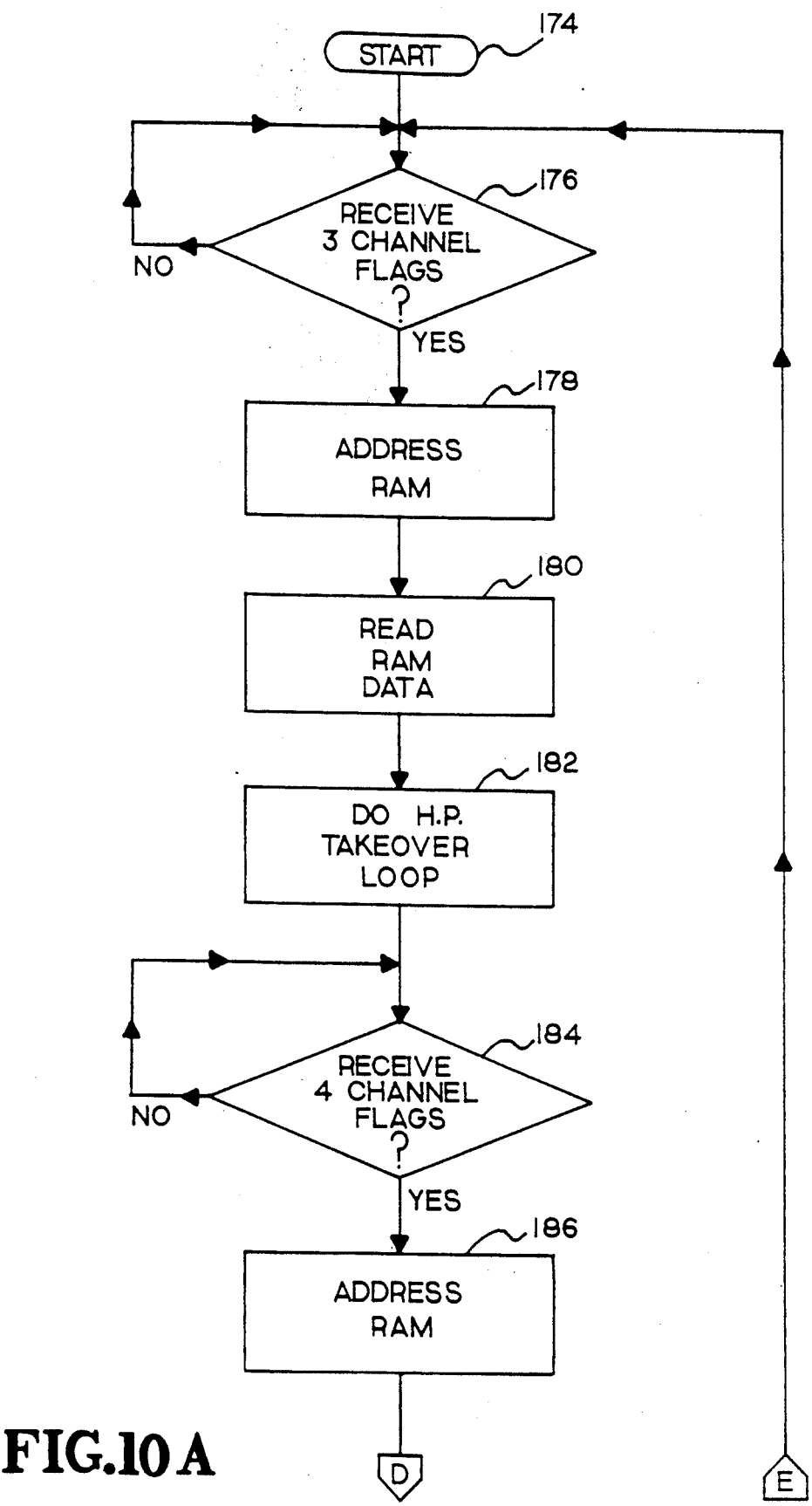
FIGS. 10a–10c represent a corresponding flowchart for the processor.
Figure 10:
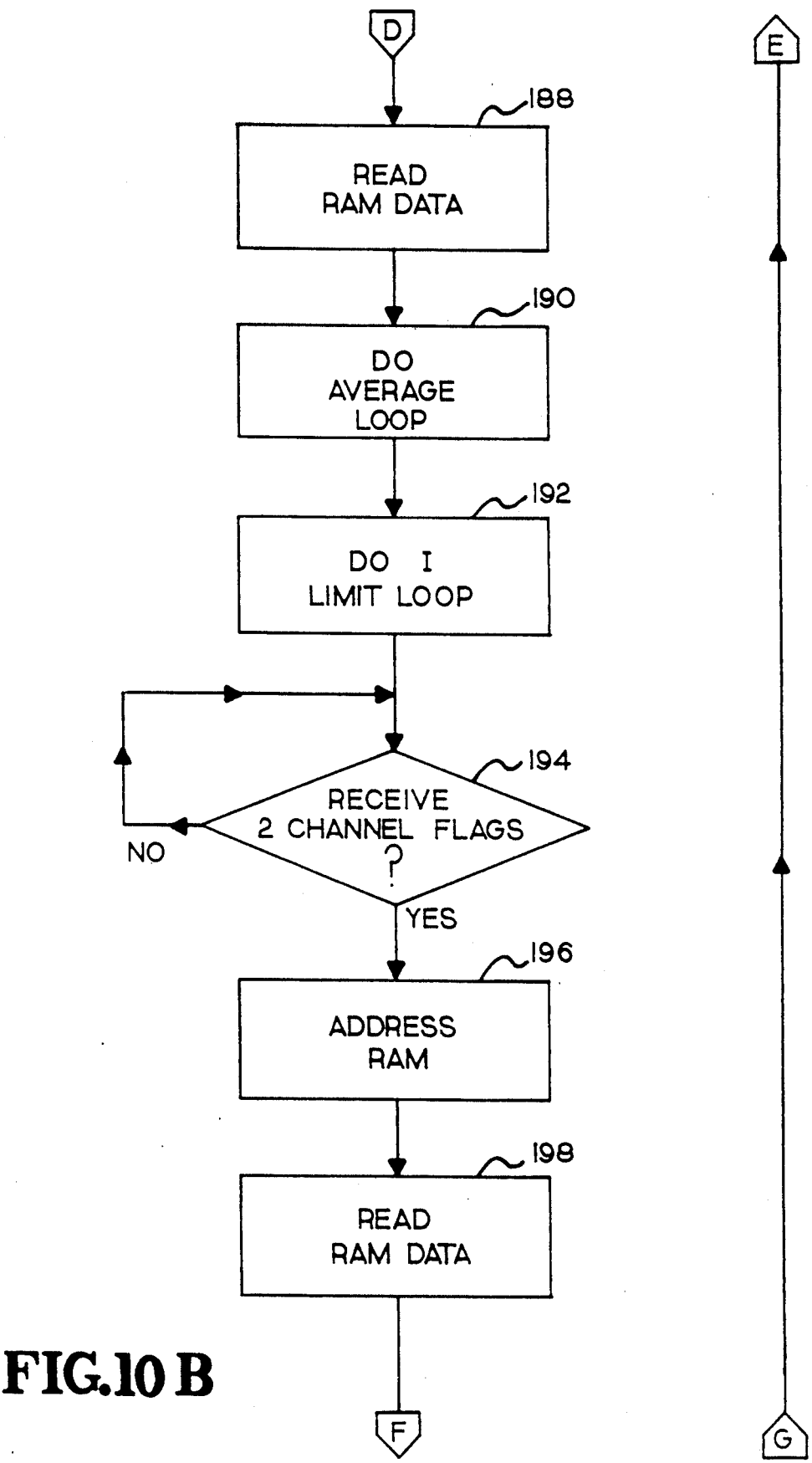
Figure 10:
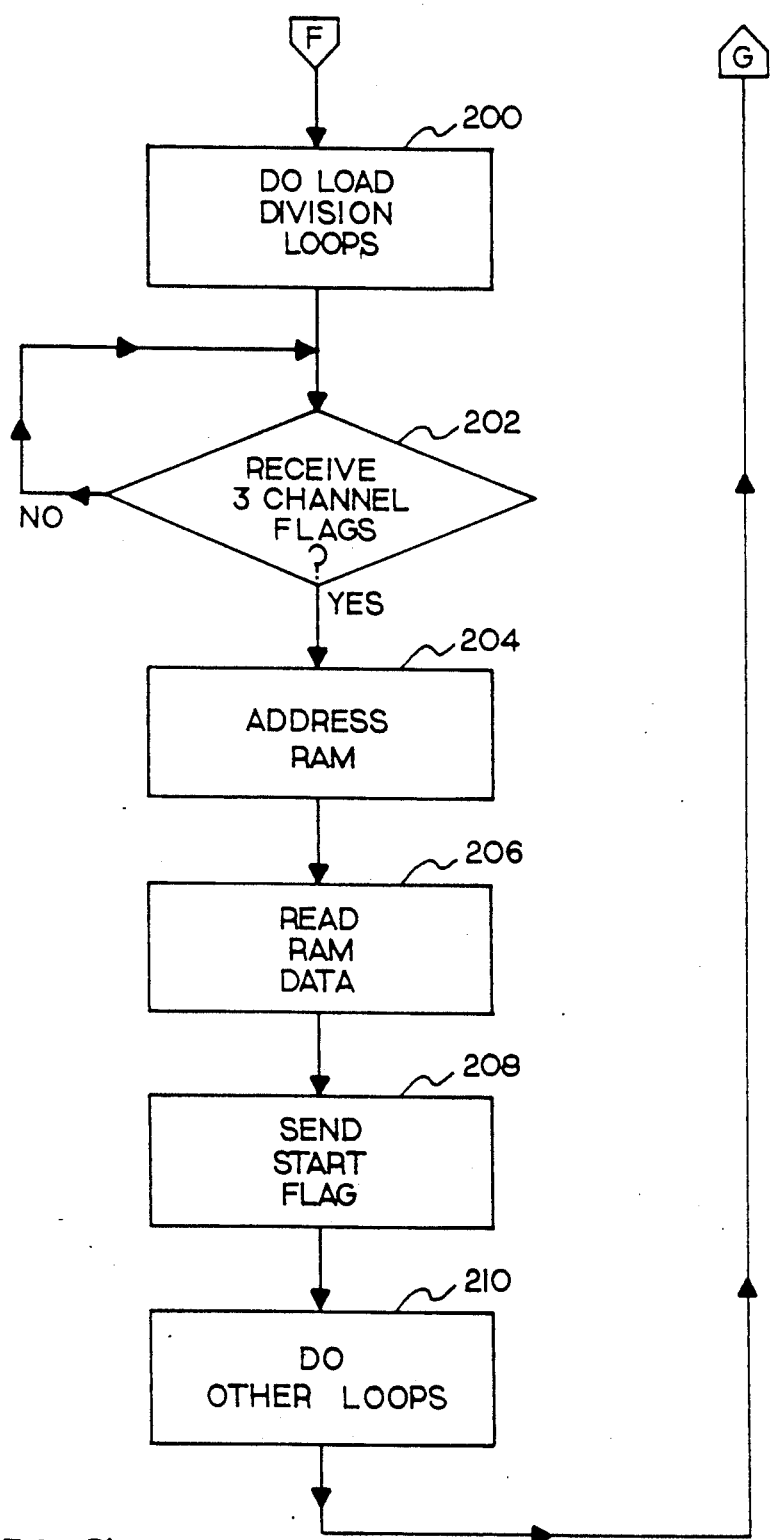

FIGS. 10a and 10b represent the sequence of operations performed by the VR processor 92 in executing the eight control loops described in Table 1. Upon starting at step 174, the VR processor waits to receive the first three channel flags via the NEXT channel signal in step 176, since information from each of the three POR phases is required before the VR processor can perform the first control loop. Once the first three channel flags have been received from the A/D controller, the VR processor addresses the dual-port RAM 130 in step 178, and reads the first three data samples from the RAM in step 180. In step 182, the execution of the high phase takeover loop is performed. This corresponds to the processing of Group A of FIGS. 8a and 8b.

In step 184, the VR processor waits for the next four channel flags to be received. As indicated in Table 1, information from the fourth, fifth, and sixth channels are required to perform the VR current limit loop, and the POR average parameter from the seventh channel is required to perform the balanced average loop. However, the balanced average loop must be performed in the VR processor before the current limit loop. Therefore, once the next four channel flags are received, the particular RAM storage locations corresponding to these channels are addressed, and the data samples are read from the RAM in steps 186 and 188. The balanced average loop is executed in step 190, and the current limit loop is executed in step 192. These two loops represent Group B of FIG. 8.

In step 194 of FIG. 10b, the VR processor waits for the next two channel flags to be received. Upon receipt of theses flags, the RAM is addressed in step 196, and read in step 198. The load division loops, corresponding to Group C of Table 1, is performed in step 200. At step 202, the VR processor waits for the remaining three channel flags to be received. The data is then addressed and read from the RAM in steps 204 and 206. Since all channels have now been read from the RAM, the VR processor sends the start-multiplexing flag to the A/D controller in step 208. This allows the controller to begin multiplexing through the next group of twelve channels, while the VR processor is executing the remaining three control loops of Group D in step 210. Control then returns to step 176, again instructing the VR processor to wait for receipt of the first three channel flags before beginning execution of the first control loop.

In sum, it can now be appreciated that the present invention provides a data acquisition technique to interface the output requirements of an A/D-based programmable controller to the input requirements of a microprocessor, when data must be derived from a plurality of analog input signals. If a fast A/D converter is used, then the A/D controller will multiplex and convert samples from all twelve multiplexed analog input signals, load the RAM, and wait for the VR processor to send a start flag indicating that new samples can be acquired. On the other hand, if the A/D conversion rate is slow, the A/D controller continuously cycles through all twelve multiplexed channels, while the VR processor waits for the appropriate channel information to be loaded into the RAM. Thus, a reversible master/slave handshaking protocol is established between the programmable controller and the microprocessor, based upon their respective operating rates.

Utilizing an A/D converter having a conversion time of 13.6 microseconds, and including 1.4 microseconds of overhead, twelve channels can be multiplexed, converted, and stored in approximately 180 microseconds. This translates to an A/D controller operating rate of 5.5 kiloHertz. Hence, if the VR processor always executes all of its control loops at exactly the same rate, then no handshaking protocol would be necessary. To maintain the design flexibility of the GCU, however, it is necessary to utilize an interfacing mechanism which is compatible with a wide variety of A/D converters. The GCU of the present invention, which performs the reversible master/slave handshaking protocol disclosed herein, is specifically adapted to permit such flexibility.

While specific embodiments of the present invention have been shown and described herein, further modifications and improvements may be made by those skilled in the art. For example, the handshaking protocol of the present invention may be used with many types of microprocessor-based or sequencer-based control systems. Moreover, the particular channel parameters and control loop functions described herein could readily be modified to fit various other controller applications. All such modifications which retain the basic underlying principles disclosed and claimed herein are within the scope of this invention.

What is claimed is:

1. A method for controlling the operation of first and second digital controllers during the acquisition of data derived from a plurality of analog input signals, said method comprising the steps of:
   (a) addressing a multiplexer by said first controller to output a particular one of said plurality of analog input signals as a time-multiplexed analog output signal;
   (b) converting a portion of said time-multiplexed analog output signal into digital data to provide a data sample;
   (c) addressing a particular storage location in a memory;
   (d) storing said data sample at said particular storage location in said memory;
   (e) providing an end-channel signal from said first controller to said second controller;
   (f) repeating the above steps using new multiplexer and memory addresses until data samples from a desired plurality of said analog input signals have been stored in said memory;
   (g) reading a plurality of storage locations of said memory by said second controller only after the end-channel signal corresponding to that storage location has been received;
   (h) providing a start-multiplexing signal from said second controller to said first controller only after the desired storage locations have been read; and
   (i) waiting for said start-multiplexing signal from said second controller before repeating the above steps.

2. The method according to claim 1, wherein said first and second digital controllers have first and second operating rates, respectively, and further comprising the step of controlling said first and second controllers such that they exhibit a reversible master/slave relationship as determined by their respective operating rates, whereby the slave controller waits for the master controller to provide its respective signals.

3. The method according to claim 1, wherein said converting step is performed by an analog-to-digital (A/D) converter having a first operating rate, and wherein said second digital controller is a microprocessor having a second operating rate.

4. The method according to claim 3, wherein said microprocessor executes multiple sets of instructions corresponding to multiple feedback control loops, said multiple feedback control loops utilizing data derived from said plurality of analog input signals.

5. The method according to claim 1, wherein said first and second digital controllers are components of a generator control unit for an electrical power generating system including a generator having a power output signal which is controllable by a generator control signal, and further comprising the steps of:
   monitoring various parameters of said generator power output signal, thereby providing said plurality of analog input signals;
   providing a digital control signal in response to data derived from said plurality of stored data samples; and
   conditioning said digital control signal to provide said generator control signal.

6. The method according to claim 5, wherein at least one of said first and second digital controllers is a component of a digital voltage regulator, and further comprising the step of maintaining the voltage level of said generator power output signal at a constant level.

7. A method for controlling the acquisition of data derived from a plurality of analog input signals to be read by a microprocessor, said method comprising the steps of:
   (a) waiting for a start-multiplexing signal from said microprocessor;
   (b) addressing a multiplexer to output a particular one of said plurality of analog input signals at a particular time as a single analog output signal;
   (c) providing a start-sampling signal to an analog-to-digital (A/D) converter;
   (d) digitally sampling in said A/D converter said single analog output signal to provide a data sample;
   (e) providing an end-sampling signal from said A/D converter;
   (f) addressing a particular storage location in a memory;
   (g) storing said data sample at said particular storage location in said memory;
   (h) providing an end-channel signal to said microprocessor;
   (i) incrementing said multiplexer and memory addresses;
   (j) repeating steps (b) through (i) until data samples from all of said plurality of analog input signals have been stored in said memory;
   (k) reading at least one of said particular storage locations of said memory by said microprocessor only after the corresponding end-channel signal for that storage location has been received; and
   providing said start-multiplexing signal only after the desired storage locations have been read.

8. A generator control unit for an electrical power generating system including a generator having a power output signal which is controllable by a generator control signal, said generator control unit comprising:
   a plurality of input means for monitoring various parameters of said generator power output signal, and for providing a corresponding plurality of analog input signals;
   means for multiplexing said plurality of analog input signals as a multiplexed analog signal;
   means for converting said multiplexed analog signal into a plurality of data words, said converting means having a first operating rate;
   buffer means for storing said plurality of data words;
   processor means for providing a digital control signal in response to said plurality of stored data words, said processor means including:
      internal memory means for storing multiple sets of instructions corresponding to multiple feedback control loops, said multiple feedback control loops corresponding to said various parameters of said generator power output signal;
      logic means, having a second operating rate, for executing each of said multiple sets of instructions utilizing information provided by at least one of said plurality of stored data words; and
      interface means for controlling said multiplexing means, said converting means, said buffer means, and said logic means in response to said first and second operating rates, such that said logic means and said converting means exhibit a reversible
master/slave relationship as determined by their respective operating rates; and
said generator control unit further comprising:
output means for conditioning said digital control signal, thereby providing said generator control signal.

9. The generator control unit according to claim 8, wherein said plurality of analog input signals includes a voltage signal, and wherein said processor means includes means for providing a digital control signal, in response to said voltage signal, which maintains the generator output power signal at a desired voltage level.

10. The generator control unit according to claim 8, wherein said generator control signal is a pulse-width modulated signal having a duty cycle in accordance with said digital control signal.

11. The generator control unit according to claim 8, wherein said converting means is an analog-to-digital converter having a first operating rate corresponding to its conversion rate.

12. The generator control unit according to claim 8, wherein said buffer means is a random-access memory which is accessible to both said processor means and said converting means.

13. The generator control unit according to claim 8, wherein said multiple feedback control loops include a voltage feedback control loop and a current feedback control loop.

14. The generator control unit according to claim 8, wherein said generator power output signal has multiple voltage phases, and wherein said input means includes means for monitoring each of said multiple voltage phases.

15. The generator control unit according to claim 8, further comprising means for addressing said multiplexing means in response to addressing signals provided by said interface means.

16. The generator control unit according to claim 8, wherein said various generator power output signal parameters include the output voltage and output current of said generator.

17. The generator control unit according to claim 8, wherein said interface means includes means for providing an end-channel signal to said logic means only after said buffer means has stored each data word corresponding to each of said plurality of analog input signals.

18. The generator control unit according to claim 17, wherein said logic means includes means for waiting for a particular end-channel signal from said interface means before said logic means executes a particular set of instructions which utilizes information provided by those stored data words corresponding to said particular end-channel signal.

19. The generator control unit according to claim 8, wherein said logic means includes means for providing a start-multiplexing signal to said interfacing means only after desired stored data words have been read from said buffer means.

20. The generator control unit according to claim 19, wherein said interface means includes means for waiting for said start-multiplexing signal from said logic means before continuing to control said multiplexing means.

* * * * *